J. A. GOODNER & A. P. KENDIG.
VARIABLE SPEED MECHANISM.
APPLICATION FILED SEPT. 23, 1907.
921,233.
Patented May 11, 1909.
2 SHEETS—SHEET 1.
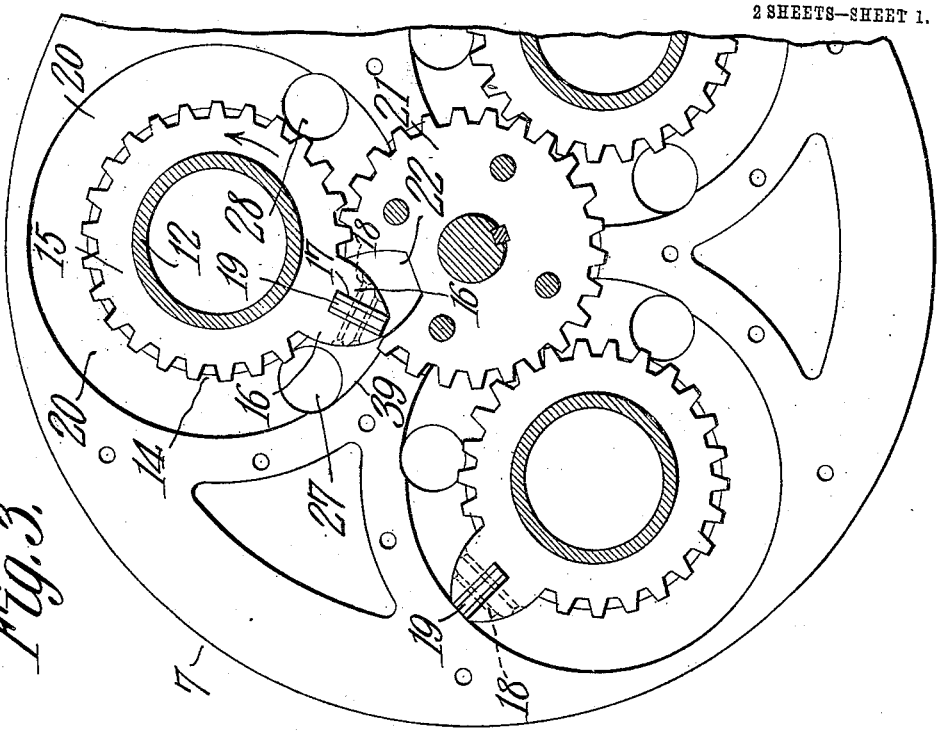
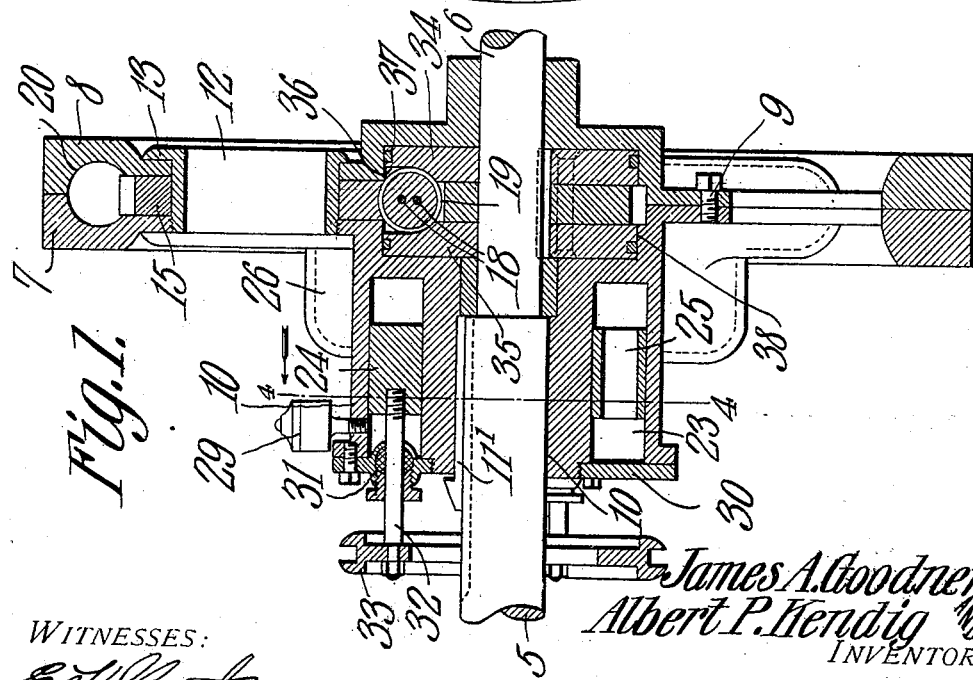
WITNESSES:
James A. Goodner
Albert P. Kendig
INVENTORS
By C. A. Snow & Co.
ATTORNEYS

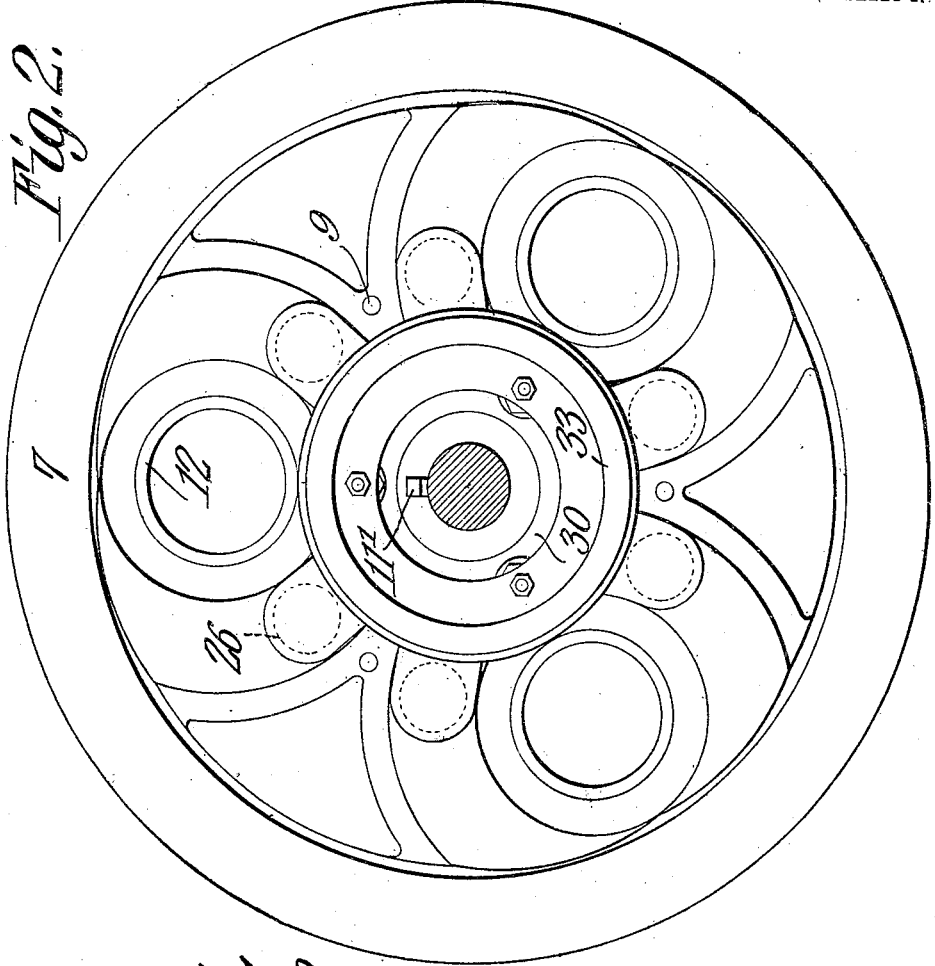
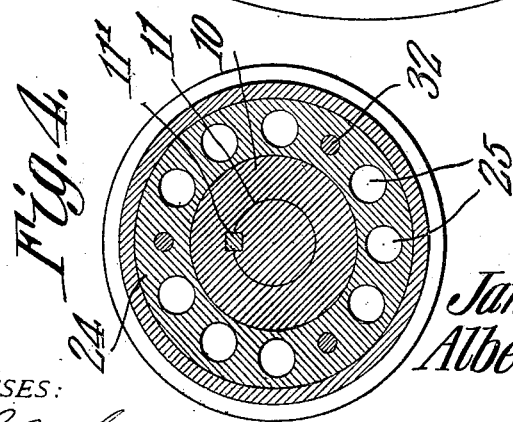

UNITED STATES PATENT OFFICE.

JAMES ANDREW GOODNER AND ALBERT PAUL KENDIG, OF ROCKY FORD, COLORADO.

VARIABLE-SPEED MECHANISM.

No. 921,233.          Specification of Letters Patent.          Patented May 11, 1909.

Application filed September 23, 1907. Serial No. 394,209.

*To all whom it may concern:*

Be it known that we, JAMES ANDREW GOODNER and ALBERT PAUL KENDIG, citizens of the United States, residing at Rocky Ford, in the county of Otero and State of Colorado, have invented a new and useful Variable-Speed Mechanism, of which the following is a specification.

This invention relates to variable speed mechanism for fly wheels, pulleys, shafting, clutches and other machinery and has for its object to provide means whereby a driven element may be caused to rotate at any degree of speed relative to and less than that of the driving element.

A further object of the invention is to provide mechanism of the class described in which the speed of one of the elements is controlled by fluid pressure actuating devices carried by the other element.

A further object is to form the driving element with a plurality of fluid receiving chambers having pinions mounted for rotation therein and adapted to mesh with a relatively stationary gear carried by the driven element, said pinions being provided with pistons which are actuated by the fluid to rotate the gear when the flow of fluid is impeded or obstructed thereby to transmit motion from the driving element to the driven element.

A further object is to provide a valve for controlling the flow of fluid from one chamber to the other, and means for supplying fluid to the chamber through the valve.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a vertical sectional view of a variable speed mechanism constructed in accordance with our invention. Fig. 2 is a front elevation of the same. Fig. 3 is a rear elevation partly in section with one of the sections of the fly wheel removed. Fig. 4 is a vertical sectional view taken on the line 4—4 of Fig. 1.

Similar numerals of reference indicate corresponding parts in all of the figures of the drawings.

The improved mechanism forming the subject matter of the present invention may be used in connection with any kind of machinery in which it is desired to regulate or vary the speed of a driven element with respect to the driving element, and by way of illustration is shown as a means for imparting motion from a driving shaft 5 to a driven member or shaft 6.

The driving element consists of a fly wheel or pulley preferably formed in two sections 7 and 8 having their adjacent faces rigidly secured together by bolts or similar fastening devices 9.

Extending laterally from the section 7 and preferably formed integral therewith is a hub 10 having a central bore 11 for the reception of the driving shaft 5 and to which it is rigidly secured as by a key or spline 11', whereby the fly wheel is caused to rotate with the driving shaft.

The sections 7 and 8 of the fly wheel are pierced by a plurality of transverse openings the walls of which are threaded for engagement with the correspondingly threaded walls of suitable bushings or housings 12, said bushings being provided with laterally extending flanges 13 which bear against the exterior face of the section 8, as shown, and serve to assist in locking the sections of the fly wheel in assembled position. Surrounding the bushings 12 are circular fluid receiving chambers 14 in which are mounted for rotation on the bushings 12 suitable pinions 15. The peripheral edges of the pinions are formed with spaced ears or lugs 16 for the reception of suitable disks or heads 17 which constitute pistons, said pistons being fastened in position between the ears 16 by bolts or similar fastening devices 18 and having their exterior walls provided with split rings or gaskets 19 which bear against the correspondingly curved walls 20 of the fluid receiving chambers, as shown.

Keyed or otherwise rigidly secured to the driven shaft 6 is a relatively stationary gear 21 provided with a peripheral pocket or recess 22 for the reception of the pistons 17 of the pinions, said pinions or planetary gearing under normal conditions being free to revolve around the central relatively stationary gear 21 without affecting the latter. The pistons 17 are so positioned on the pinions that when said pinions are rotated on the gear 21 to a position opposite the recess 22 the pistons will enter the recess, as best shown in Fig. 3 of the drawings.

The hub 10 is provided with an annular chamber 23 in which is mounted for reciprocation a correspondingly shaped valve 24, the latter being provided with a plurality of longitudinal openings or passages 25 to permit the flow of fluid from the oil receiving chambers 14 through the valve. The conductors or pipes 26 communicate with intake and discharge ports 27 and 28 which open through the chambers 14 so that under normal conditions the oil in the chamber 14 is free to circulate between the valve chamber 23 and the oil receiving chamber 14.

Communicating with one end of the valve chamber 23 is a feed cup 29 by means of which oil or other fluid may be introduced through the longitudinal passages 25 into the conductors 26 and thence to the fluid receiving chambers 14 thus permitting the latter to be supplied with fluid without the necessity of detaching the sections of the fly wheel.

Bolted or otherwise rigidly secured to the free end of the hub 10 is a disk 30 which forms a closure for the adjacent end of the valve chamber 23 and is provided with one or more glands 31 for the reception of suitable actuating rods 32. One end of each rod 32 is threaded in the valve 24 while the opposite end thereof is bolted or otherwise secured to a collar 33 slidably mounted on the driving shaft 5 and to which may be attached an operating lever so that by operating the lever the valve 24 may be actuated to control the flow or circulation of fluid in the several oil receiving compartments.

The relatively stationary gear 21 is reinforced and strengthened by the provision of side plates or disks 34 and 35 which are riveted, bolted or otherwise rigidly secured to the gear 21 and are provided with recessed faces 36 to accommodate the pistons on the pinions 15. The disks 34 and 35 are provided with packing rings 37 which bear against the interior wall of the chamber 38 so as to prevent the escape of fluid.

Attention is here called to the fact that the walls of the oil receiving chambers 14 between the ports 27 and 28 are enlarged laterally, as indicated at 39 so as to permit a small quantity of oil to escape around the peripheral edge of the pistons 17 when the latter enter the recess 22 in the relatively stationary gear.

It will thus be seen that when the valve 24 is in the position shown in Fig. 1 of the drawings the fluid in the several chambers or compartments is free to circulate from one to the other and the fly wheel carrying the pinions 16 free to revolve around the relatively stationary gear 21 without affecting the driven shaft 6. As soon, however, as the valve 24 is moved to closed or partially close position the flow of oil from one chamber to the other will be obstructed or impeded thus preventing independent rotation of the pinions 15 and causing the latter to engage or clutch the gear 21 and transmit rotary motion to the driven shaft.

It will of course be understood that the number of pinions carried by the driving element or fly wheel may be varied at will and that if desired the several parts may be reversed, that is to say, the pinions may be carried by the driven member and the gear by the driving member.

From the foregoing description it is thought that the construction and operation of the device will be readily understood by those skilled in the art and further description thereof is deemed unnecessary.

Having thus described the invention what is claimed is:

1. In variable speed mechanism, a driving element, a driven element, a relatively stationary gear carried by one of said elements, a pinion mounted for rotation on the other element, a piston secured to and mounted for rotation with the pinion, a body of fluid for retarding the movement of the piston, and a valve for controlling the circulation of fluid, thereby to lock the pinion in engagement with the gear.

2. In variable speed mechanism, a driving element, a driven element, a relatively stationary gear carried by one of said elements, there being a fluid receiving chamber formed in the other element, a pinion mounted for rotation in the fluid chamber, a piston secured to and mounted for rotation with the pinion and a valve for controlling the flow of fluid thereby to lock the pinion in engagement with the gear.

3. In variable speed mechanism, a driving element, a driven element, a relatively stationary gear carried by one of the elements, bushings piercing the other element, pinions mounted for rotation on the bushings, pistons secured to and mounted for rotation with the pinions, a body of fluid circulating between the pistons, and a valve for controlling the circulation of fluid thereby to lock the pinions in engagement with the gear.

4. In variable speed mechanism, a driving element, a driven element, a relatively stationary gear carried by one of said elements, pinions mounted for rotation on the other element, pistons carried by the pinions, a body of fluid circulating between the pistons, a hollow valve for controlling the circulation of fluid thereby to lock the pinions in engagement with the gear, and means communicating with one end of the valve for supplying fluid through the valve to the pistons.

5. In variable speed mechanism, a driving element, a driven element, a relatively stationary gear carried by one of said elements, there being a fluid receiving chamber formed in the other element, a pinion mounted for rotation in the fluid chamber, a valve for controlling the flow of fluid thereby to lock the pinion in engagement with the gear and having longitudinal fluid passages formed therein, and means communicating with one end of the valve for supplying fluid through the passages to said fluid chamber.

6. In variable speed mechanism, a sectional driving element having a plurality of fluid receiving chambers formed therein, bushings extending transversely through the sections and forming closures for the chambers, pinions mounted for rotation on the bushings, pistons carried by the pinions, a driven element, a gear secured to the driven element and provided with a pocket adapted to receive the pistons of the pinions, a body of fluid circulating in the chambers, and a valve for controlling the flow of fluid thereby to lock the pinions in engagement with the gear.

7. In variable speed mechanism, a driving element having a laterally extending hub provided with a valve chamber, a pinion mounted for rotation on the driving element, a piston carried by the pinion, a driven element having a gear secured thereto, a body of fluid circulating between the piston and valve chamber, and a valve arranged within the valve chamber for controlling the circulation of fluid thereby to lock the pinion in engagement with the gear.

8. In variable speed mechanism, a driving element, a driven element, a relatively stationary gear carried by one of said elements, there being a fluid receiving chamber formed in the opposite element, a pinion mounted for rotation in the fluid chamber, a piston secured to and mounted for rotation with the pinion, a valve chamber, ports communicating with the valve chamber and fluid receiving chambers, and a valve mounted for reciprocation in the valve chamber for controlling the circulation of fluid thereby to lock the pinion in engagement with the gear.

9. In variable speed mechanism, a driving element, a driven element, a relatively stationary gear carried by one of said elements, there being fluid receiving chambers formed in the other element, bushings forming one wall of each fluid receiving chamber, pinions mounted for rotation on the bushings, pistons carried by the pinions and working within the chambers, a hub extending laterally from one of said elements and provided with a valve chamber, conductors forming a source of communication between the valve chamber and fluid receiving chambers, a body of fluid circulating within the fluid chambers, and a valve mounted for reciprocation within the valve chamber for controlling the flow of fluid thereby to lock the pinions in engagement with the gear.

10. In variable speed mechanism, a driving element provided with a laterally extending hub having a valve chamber formed therein, bushings piercing the driving member and surrounded by fluid receiving chambers, pinions mounted for rotation on the bushings, pistons carried by the pinions and operating within the fluid receiving chambers, a driven member, a gear secured to the driven member and provided with a recess for the reception of the pistons, plates secured to the opposite sides of the gear and having their inner faces recessed for registration with the recess in the gear, a body of fluid circulating in the fluid chambers, conductors forming a source of communication between the valve chamber and the fluid receiving chambers, and a valve mounted for reciprocation within the valve chamber for controlling the flow of fluid thereby to lock the pinions in engagement with the gear.

In testimony that we claim the foregoing as our own, we have hereto affixed our signatures in the presence of two witnesses.

JAMES ANDREW GOODNER.
ALBERT PAUL KENDIG.

Witnesses:
  J. H. WARD,
  J. F. McKELVEY.